E. SEAVEY.
MANUFACTURE OF NATURAL ICE.
APPLICATION FILED SEPT. 28, 1912.
1,163,472.
Patented Dec. 7, 1915.
2 SHEETS—SHEET 1.
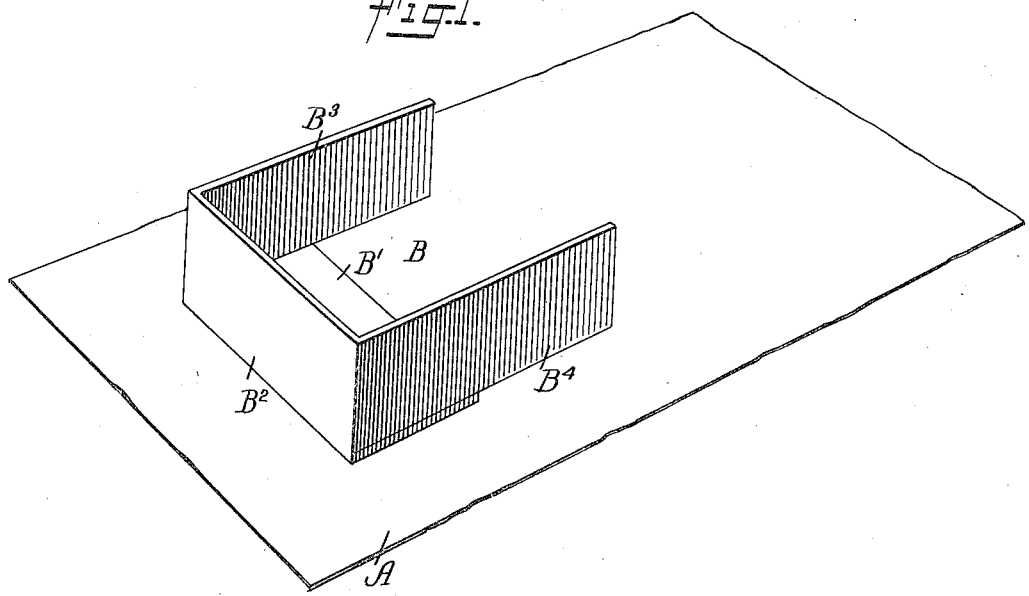
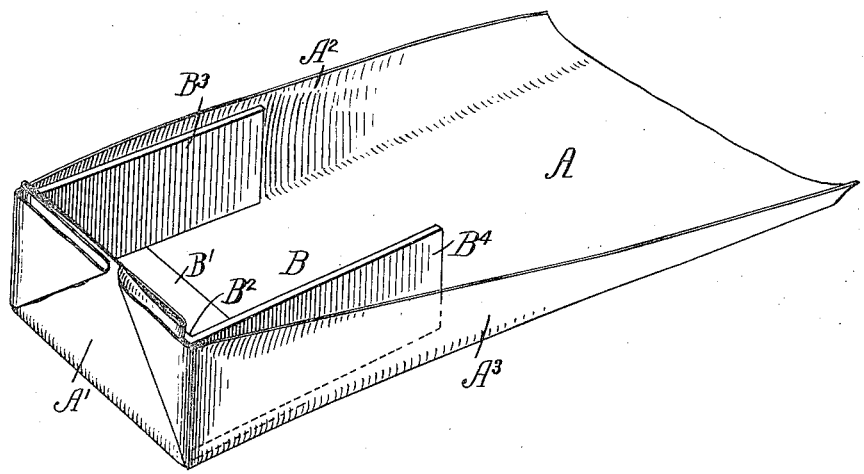
WITNESSES
INVENTOR
Eugene Seavey,
BY
ATTORNEYS E. SEAVEY.
MANUFACTURE OF NATURAL ICE.
APPLICATION FILED SEPT. 28, 1912.
1,163,472.
Patented Dec. 7, 1915.
2 SHEETS—SHEET 2.
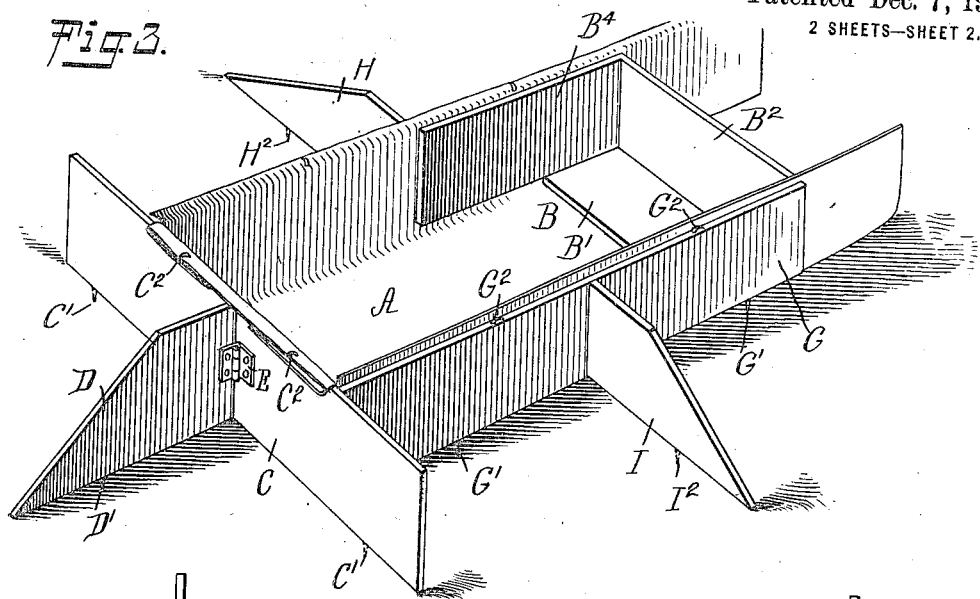
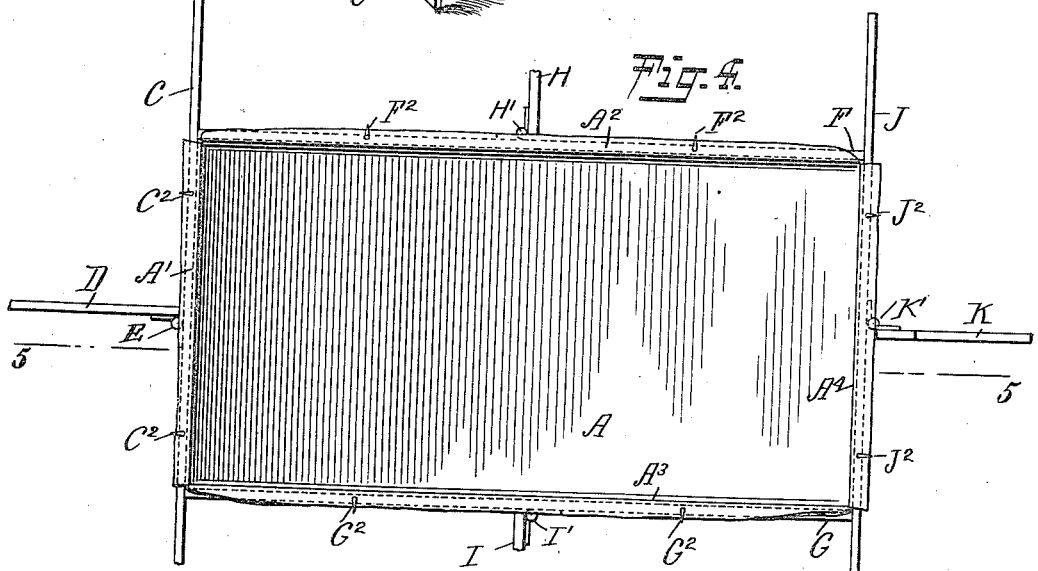
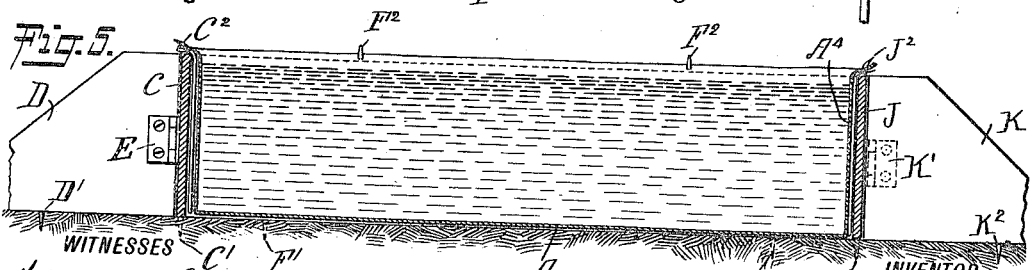
WITNESSES
William P. Goebel.
Rob J. Hosty.
INVENTOR
Eugene Seavey,
BY
Munn & Co.
ATTORNEYS

UNITED STATES PATENT OFFICE.

EUGENE SEAVEY, OF NEW YORK, N. Y.

MANUFACTURE OF NATURAL ICE.

1,163,472.        Specification of Letters Patent.        Patented Dec. 7, 1915.

Application filed September 28, 1912. Serial No. 722,942.

*To all whom it may concern:*

Be it known that I, EUGENE SEAVEY, a citizen of the United States, and a resident of the city of New York, borough of Manhattan, in the county and State of New York, have invented new and useful Improvements in the Manufacture of Natural Ice, of which the following is a full, clear, and exact description.

The object of the invention is to provide certain new and useful improvements in the manufacture of natural ice during the cold season and whereby the water is quickly frozen into blocks or cakes by the use of an inexpensive apparatus.

The invention consists in the method of making natural ice in thin impervious paper pans by first subjecting the surface of the water contained in the pan to the action of cold atmospheric air to form a top ice crust freezing to the sides of the pan to sustain the latter, and then subjecting the sides of the pan to the action of cold atmospheric air to freeze the water below the said crust.

In order to carry this method into effect use is made of a pan made from a thin sheet of paraffin or other impervious paper or similar material, the sheet being formed into a pan by the use of an inside former, and exterior ends and sides, of which the inside former is removed after the sheet is formed into a pan, and the exterior ends and sides are removed after the water in the pan has formed into a top ice crust.

A practical embodiment of the invention is represented in the accompanying drawings forming a part of this specification, in which similar characters of reference indicate corresponding parts in all the views.

Figure 1 is a perspective view showing the impervious sheet of paper spread on the ground with the inside former in position on the sheet; Fig. 2 is a similar view of the same with one end and part of the sides of the sheet folded onto the former; Fig. 3 is a similar view of the same showing one exterior end and the exterior sides and the inside former in position on the partly finished pan; Fig. 4 is a plan view of the finished pan and the sustaining ends and sides in position; and Fig. 5 is a sectional side elevation of the same on the line 5—5 of Fig. 4.

In order to form the pan for containing water from a single sheet A of paraffin paper or other impervious material, the sheet is placed on the ground or other surface, as indicated in Fig. 1, and on top of the sheet and near one end thereof is placed an inside former B having a bottom B', and end $B^2$ and sides $B^3$, $B^4$, to permit of bending the adjacent end of the sheet A up against the end $B^2$ and likewise bending the side portions of the sheet A upward against the sides $B^3$, $B^4$, as will be readily understood by reference to Fig. 2. When this has been done, use is made of an exterior end C placed against the folded end A' of the sheet A, and the end C is provided on its bottom with depending pins C' pressed into the ground so as to sustain the end C in upright position against the folded end A' of the sheet. A brace D is connected by a hinge E with the end C or near the middle thereof, and the bottom of this brace D is provided with a pin D' adapted to be pressed into the ground, so as to assist in holding the end C firmly in position, as will be readily understood by reference to Figs. 3, 4 and 5. The top of the side C is provided with hooks $C^2$, engaged by the upper portion of the folded end A' to securely hold this folded end in position on the exterior end C.

The exterior sides F and G are next placed against the upturned sides $A^2$ and $A^3$ of the sheet A so as to sustain the said sides of the pan in form. The side F is provided at the bottom with pins F' adapted to be driven into the ground and the side F is also provided with a base H connected by a hinge H' with the side F at or near the middle thereof. The brace H is provided at the bottom with a pin $H^2$ adapted to engage the ground to firmly hold the side F in vertical position, one end of the side abutting against the end C. The top of the side F is provided with hooks $F^2$ similar to the hooks $C^2$ and engaged by the upper portion of the side $A^2$ so as to hold the latter firmly in place against the exterior side F. The side G is similar in construction to the side F, that is, is provided at the bottom with hooks G' engaging the ground and on the top with pins $G^2$ engaged by the upper portion of the side $A^3$ to sustain the latter. The side G is also provided with a brace I connected by a hinge I' with the side G at the middle thereof, and the bottom of the brace I is provided with a pin $I^2$ engaging the ground. After the sides F and G have been set up the inside former B is removed from the position shown in Figs. 1 and 2, and replaced reversedly onto the sheet A near the other end A⁴ thereof to permit of folding this end up against the end B², the latter being approximately in alinement with the outer ends of the sides F and G, as plainly indicated in Fig. 3. After the end A⁴ has been folded as described, an exterior end J is set against this folded end A⁴, and this exterior end J is provided at the bottom with pins J' engaging the ground and provided at the top with hooks J² onto which is hooked the upper portion of the end A⁴. The exterior end J abuts against the right-hand ends of the sides F and G and the said end J is also provided with a brace K connected by a hinge K' with the side J near the middle thereof. The bottom of the brace K is provided with a pin K² engaging the ground to hold the end J in vertical position.

After the pan is formed as described, and sustained exteriorly by the ends C, J and the sides F, G, then the inside former B is removed from the pan and the latter is now filled with water. Cold atmospheric air acting on the water freezes the surface thereof and the ice so formed adheres firmly to the inner surfaces of the ends A', A⁴ and the sides A², A³ of the pan to sustain the said ends and sides and to allow of removing the exterior ends C, J and the exterior sides F, G from the pan. It will be noticed that after the ends C, J and the sides F, G are removed, cold atmospheric air has access to the exterior of the surfaces of the ends A', A⁴ and the sides A², A³ of the pan to quickly reduce the temperature of the water contained in the pan with a view to freeze the water below the ice crust. After the water has formed a solid block or cake of ice in the pan, it is removed to an ice house and stored therein.

It will be noticed that the inside former B as well as the ends C, J and the sides F, G can immediately be used for forming a pan of another sheet A of impervious material while the water in the first pan is freezing, thus enabling the user to provide a large number of pans in a short time to carry on the freezing of water with the view of producing a large number of blocks or cakes of ice in a short time, and with the use of a single mold.

The mold shown and described is very simple in construction and the braces D, H, I, and K of the exterior parts of the mold can be folded upon the same when not in use, thus taking up comparatively little room for storing and shipping the mold.

Having thus described my invention, I claim as new and desire to secure by Letters Patent:

1. An ice-making apparatus comprising a pan made of an impervious sheet of flexible material, and end and side members, the end members projecting beyond the side members, the members being disconnected with each other, and each provided with pins for anchoring it and with a hinged brace for holding it in a vertical position against the pan.

2. An ice-making apparatus, comprising a pan made from an impervious sheet of flexible material, separate outer ends and outer sides adapted to engage the folded ends and sides of the pan, and retaining means on the upper edges of the outer ends and sides and adapted to be engaged by the upper portions of the ends and sides of the pan.

3. An ice-making apparatus, comprising a pan made from an impervious sheet of flexible material, separate outer ends and sides adapted to engage the ends and sides of the pan, said ends and sides having means for engaging the ground to anchor them thereto, braces hinged to the ends and sides, and means for detachably connecting the upper edges of the pan with the said ends and sides.

In testimony whereof I have signed my name to this specification in the presence of two subscribing witnesses.

EUGENE SEAVEY.

Witnesses:
   Theo. G. Hoster,
   Philip D. Rollhaus.